(12) United States Patent
Martin et al.

(10) Patent No.: US 7,356,216 B1
(45) Date of Patent: Apr. 8, 2008

(54) OPTICAL CROSS-CONNECT

(75) Inventors: Graham J. Martin, Woodland Hills, CA (US); Jian Ma, Thousand Oaks, CA (US); Chialun Tsai, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/613,489

(22) Filed: Dec. 20, 2006

(51) Int. Cl.
*G02B 6/26* (2006.01)

(52) U.S. Cl. .......................... 385/18; 385/16; 385/17; 385/19

(58) Field of Classification Search ............ 385/18–20
See application file for complete search history.

(56) References Cited

U.S. PATENT DOCUMENTS

| | | | |
|---|---|---|---|
| 6,690,885 B1 * | 2/2004 | Aksyuk et al. ............... | 398/45 |
| 6,934,438 B2 * | 8/2005 | Hoke ............................ | 385/16 |
| 2004/0184729 A1 * | 9/2004 | Martin et al. ................. | 385/33 |

* cited by examiner

*Primary Examiner*—Frank G. Font
*Assistant Examiner*—Hung Lam
(74) *Attorney, Agent, or Firm*—Klein, O'Neill & Singh, LLP

(57) ABSTRACT

An optical cross-connect is provided. The optical cross-connect includes a glass wedge, having a front end and a back end, positioned between a first one-dimensional collimator array and a second one-dimensional collimator array, where the first collimator array includes a first V-groove array having a first set of etched grooves for placing a first group of optical fibers and the second collimator array includes a second V-groove array having a second set of etched grooves for placing a second group of optical fibers; and a MEMS substrate attached at a fixed distance to the front end of the glass wedge, where the front end is covered in a reflective coating for reflecting light from the first and second collimator arrays onto the MEMS substrate.

9 Claims, 5 Drawing Sheets

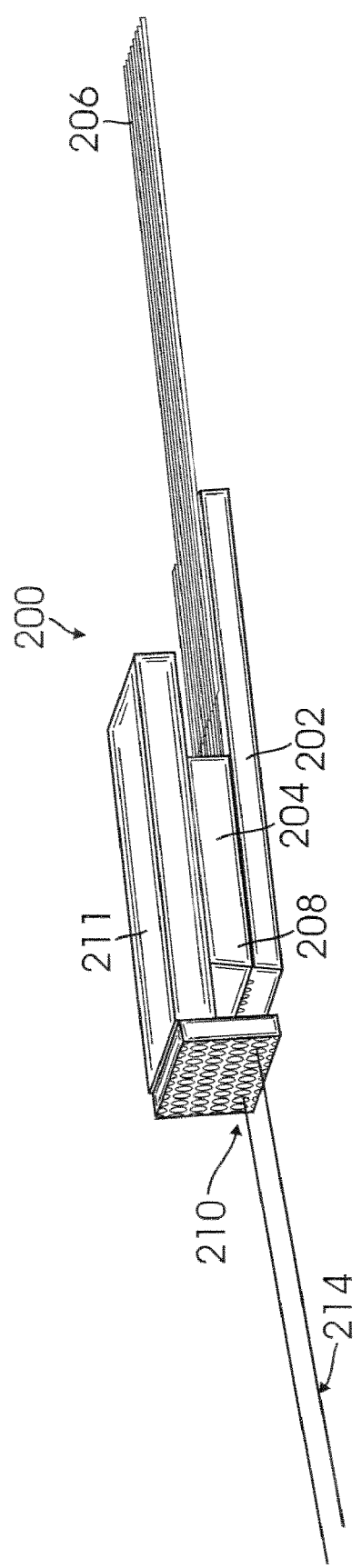

US 7,356,216 B1

OPTICAL CROSS-CONNECT

BACKGROUND

1. Field of Disclosure

The disclosure generally relates to network devices, and more particularly to optical cross-connects.

2. Related Art

Optical cross-connects are used in fiber optic communication systems. Conventional optical cross-connects use 2D (two dimensional) array of fibers with a mechanical fixture with 2D array of holes.

Conventional optical cross-connects have disadvantages of, for example, poor position tolerance and collimator alignment accuracy. This may result in high insertion loss. Furthermore, return loss is high because applying angle polish at fiber ends is difficult. Conventional systems are also difficult to manufacture. Therefore, there is a need for an optical cross-connect system that has better performance and is easier to manufacture.

SUMMARY OF THE DISCLOSURE

In one aspect of the disclosure, an optical cross-connect is provided. The optical cross-connect includes a glass wedge, having a front end and a back end, positioned between a first one-dimensional collimator array and a second one-dimensional collimator array, where the first collimator array includes a first V-groove array having a first set of etched grooves for placing a first group of optical fibers and the second collimator array includes a second V-groove array having a second set of etched grooves for placing a second groups of optical fibers; and a MEMS substrate attached at a fixed distance from the front end of the glass wedge, where the front end is covered in a reflective coating for reflecting light from the first and second collimator arrays onto the MEMS substrate.

In another aspect of the disclosure, a one-dimensional collimator array is provided. The one-dimensional collimator array includes a V-groove array having a front end, a back end and a set of etched grooves for placing a group of optical fibers, the group of optical fibers extending out the back end of the V-groove array; a glass plate attached to a top of the V-groove array for securing the group of optical fibers in the set of etched grooves; a lens array attached to the front end of the V-groove array for collimating light beams transmitted from the group of optical fibers; and a top plate attached to at top of the glass plate for holding the lens array in a fixed position.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing features and other features of the disclosure will now be described with reference to the drawings of a preferred embodiment. The illustrated embodiment is intended to illustrate, but not to limit the disclosure. The drawings include the following:

FIG. 2a shows an assembled one-dimensional (1D) collimator array, according to one aspect of the disclosure;

DETAILED DESCRIPTION

The disclosure provides a 1D (one-dimensional) optical cross-connect. To facilitate an understanding of the preferred embodiment, the general architecture and operation of a 2D optical cross-connect will be described. The specific architecture and operation of the preferred embodiment will then be described with reference to the general architecture.

Figure 1:
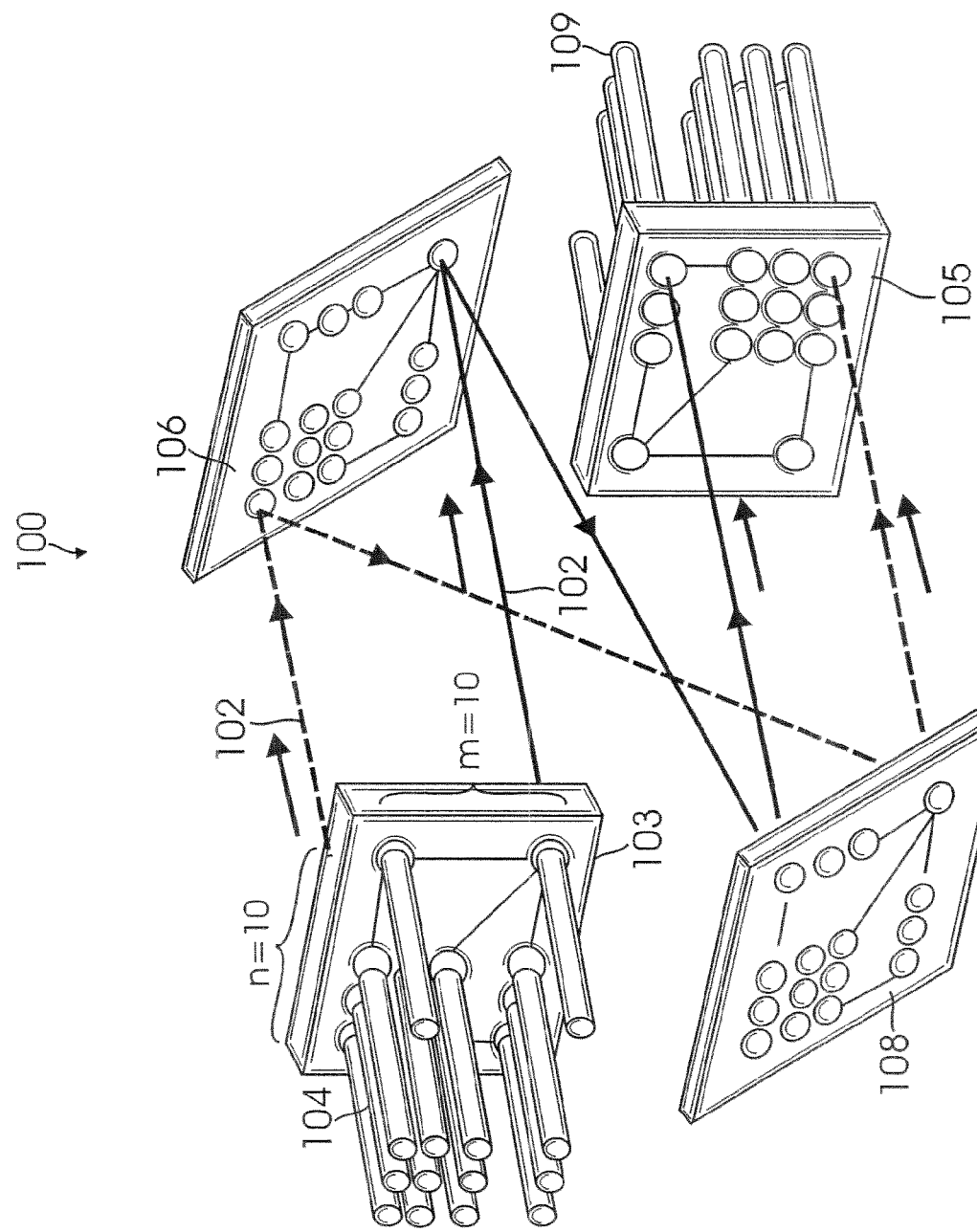
FIG. 1 shows a typical two-dimensional (2D) optical cross-connect.

FIG. 1 shows a conventional 2D optical cross-connect 100 using 2D collimator arrays with holes. Light beams 102 are transmitted via optical fibers 104 from a first micro-lens array 103 and then deflected by a first MEMS (Micro-Electro-Mechanical Systems) mirror device 106 to a second MEMS mirror device 108. Light beams 102 are then diverted to a second micro-lens array 105.

It is difficult to maintain proper positional tolerances for the holes located in matrices for lens arrays 103 and 105. Furthermore, collimator alignment is difficult to achieve for optical cross-connect 100. Return loss may be minimized by putting an angle polish at fiber ends 104, 109. This is difficult to achieve because fiber ends 104, 109 are in a 2D array arrangement requiring individual positioning and rotational alignment of the angle-polished fibers in the array fabrication.

Figure 2B:
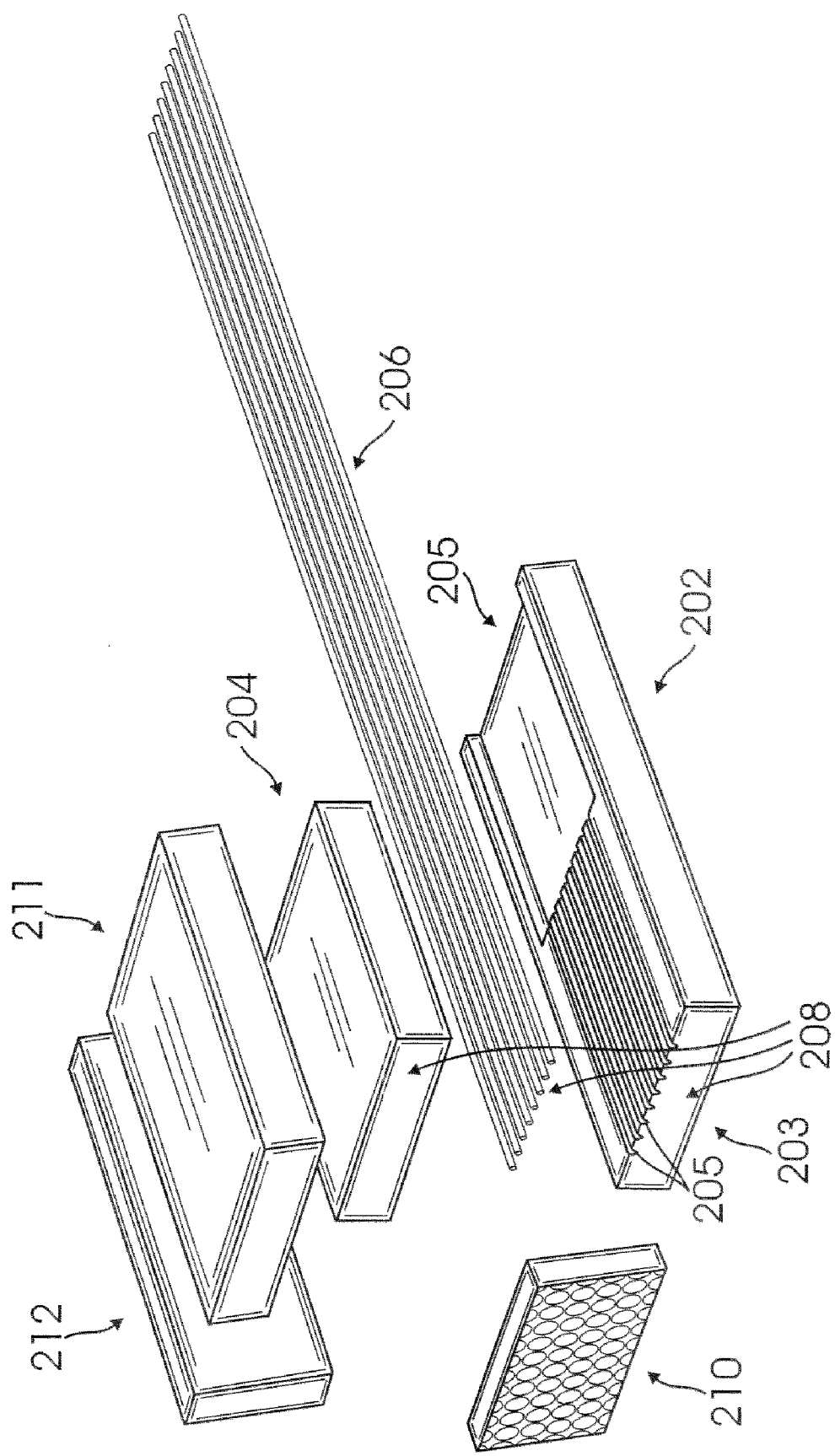
FIG. 2b shows an exploded view of the 1D collimator array of FIG. 2a, according to an aspect of the disclosure.

FIGS. 2a and 2b are assembled and exploded views, respectively, of a 1D collimator array 200 (hereinafter "collimator array 200") in accordance with an aspect of the disclosure. Collimator array 200 is used to create an optical cross-connect to perform switching between channels in a communication system.

Collimator array 200 includes a V-groove array 202, having a front end 203 and a back end 205, constructed of a piece of silicon having etched V-grooves 205. A group of optical fibers 206 is placed and epoxied in V-groove array 202, with a single fiber placed in each groove, extending out the back of V-groove array 202. A glass plate 204 is pressed down on top of V-groove array 202 securing optical fibers 206 in V-grooves 205. This prevents distortion or movement of optical fibers 206 and creates fiber array, where optical fibers 206 are all aligned in the same plane and direction, and equally spaced apart. As all optical fibers 206 in the fiber array are in a single plane, an angle polish 208, such as 8°, may be added to the ends of glass plate 204, fiber array 202 and optical fibers 206 to reduce return loss.

A 1D silicon lens array 210, for collimating light beams 214, is aligned with front end 203 of V-groove array 202, glass plate 204, and optical fibers 206 using a computerized alignment system (not shown) for optimal placement of lens array 210. The emanating collimated beams are aligned with the edges (side and bottom) of V-groove array 202 to obtain optimum coupling between channels in optical cross-connect assembly 300 (described below with reference to FIG. 3) without complex fabrication procedures.

Top plate 211 is disposed on top of glass plate 204 and is used to hole silicon lens array 210 into a fixed position relative to V-grove array 202. Silicon lens array 210 includes multiple rows of lenses, however, only one row of lenses is used and aligned with optical fibers 206 to provide accurate collimator pointing. Finally, in another aspect of the disclosure, a side plate 212 is added to secure lens array 210, glass plate 204, V-groove array 202, and top plate 211 together for use in application with large g forces. As a result, 1D collimator array 200 is created.

Figure 3:
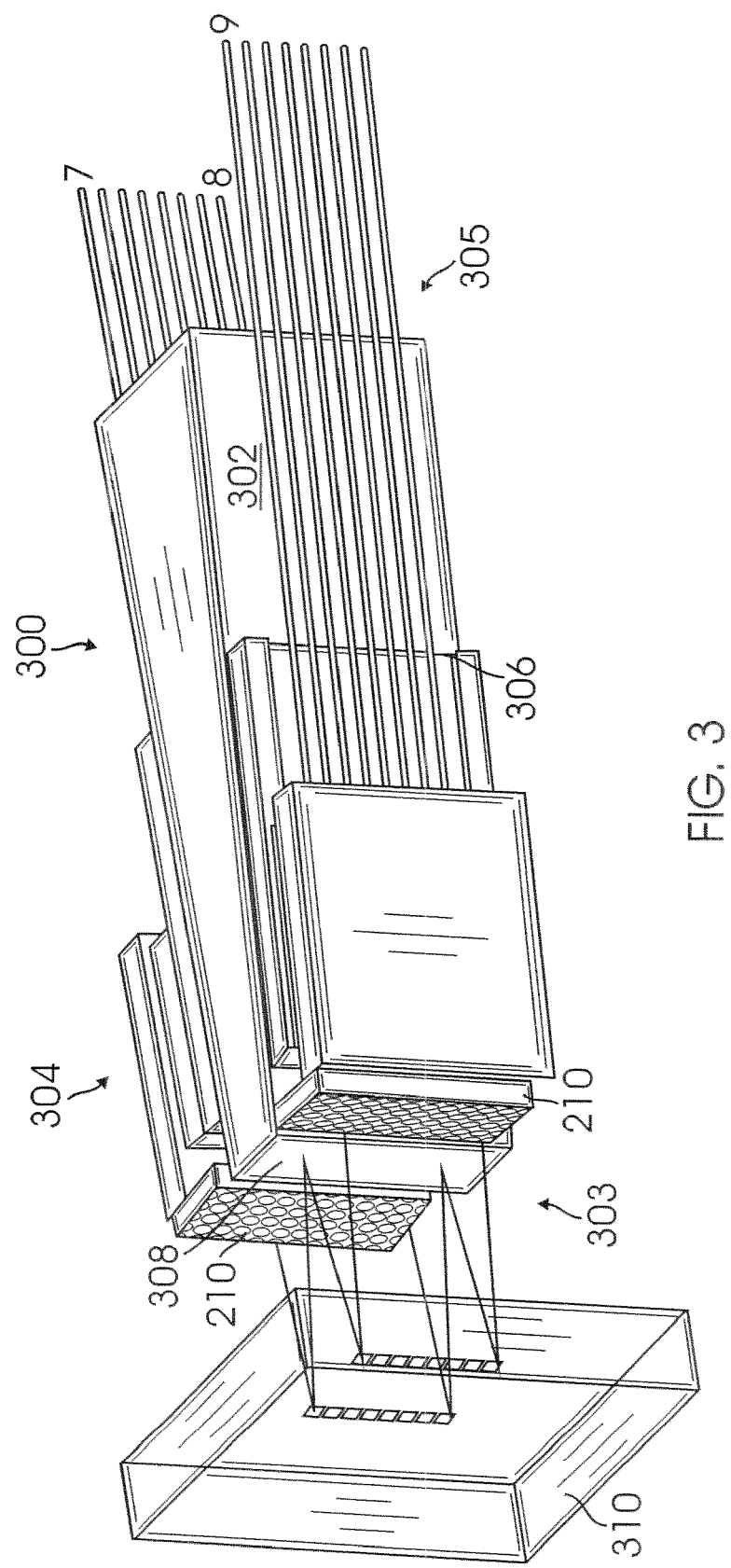
FIG. 3 shows an optical cross-connect utilizing 1D collimator arrays, according to one aspect of the disclosure.

FIG. 3 shows an optical cross-connect 300, according to one aspect of the disclosure. Optical cross-connect 300 comprise a glass wedge 302, having a front end 303 and a back end 305, positioned between and glued to a first 1D collimator array 304 and a second 1D collimator array 306. Collimator arrays 304 and 306 are mirror images of one another as imaged in a plane parallel to that of their constituent fibers. A reflective coating 308 is applied to front end 303 of glass wedge 302 for reflecting light beams onto a MEMS substrate 310.

MEMS substrate 310 includes two N-mirror columns, each mirror having tip and tilt motion capability. The collimated beams emanating from collimator arrays 304 or 306 can be described by Gaussian optics, i.e., cross-sections of the beans, at any point, have an intensity distribution described by a Gaussian function, and the beam phase fronts (i.e. points of equal phase) are spherical with the radii of curvature depending on the positions on the beam propagation axis. When the radius of curvature is infinity and the phase front is flat on the optical axis, beam waist occurs, i.e. the beam diameter is at a minimum.

Collimator arrays 304 and 306 have a certain Rayleigh length, or working distance (typically several centimeters), which is the length of the region on a collimator optical axis where the beam diameter is less than the smallest beam diameter, occurring at the waist, multiplied by a factor of the square root of two. This is typically referred to as the usable beam region in free space for good inter-collimator light coupling. Thus MEMS substrate 310, (representing the midpoint in the free space beam path between collimator arrays 304 and 306) is optimally positioned for minimum coupling losses so that the beam waist lies close to the mirror surfaces.

Although two eight channel collimators arrays are shown, this is by way of example only and more or less channels can be utilized. For example, the eight-channel collimator array can be replaced by a sixteen channel collimator array, doubling the width. The functionality of optical cross-connect 300 is described below with respect to FIGS. 4a and 4b.

Figure 4A:
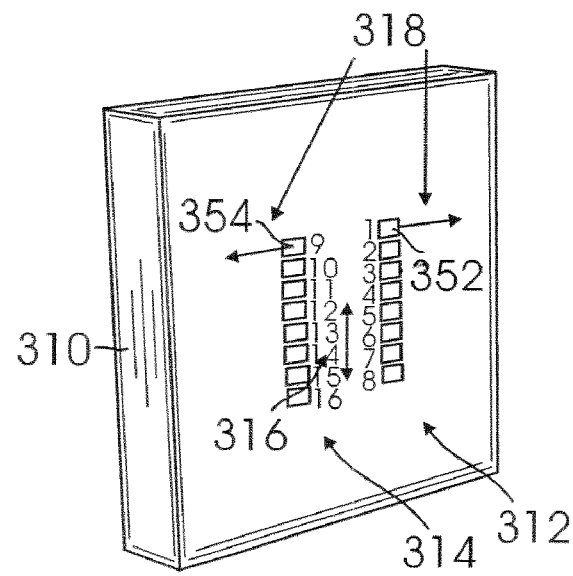
FIG. 4a shows a side perspective view of a MEMS substrate, in accordance with one aspect of the disclosure.

FIG. 4a shows a side perspective view of MEMS substrate 310, in accordance with one aspect of the disclosure. As described above, MEMS substrate 310 includes a first column of mirrors 312 with two-axis motion capability (mirrors #1-#8) and a second column of mirrors 314 with two-axis motion capability (mirrors #9-#16). Typically, with no voltages applied to the MEMS-mirror drive combs (not shown), beams travel from mirror #1 to mirror #9; mirror #2 to mirror #10; mirror #3 to mirror #11; mirror #4 to mirror #12; mirror #5 to mirror #13; mirror #6 to mirror #14; mirror #7 to mirror #15; and mirror #8 to mirror #16. As appropriate voltages are applied to the MEMS-mirror drive combs, any of the output from collimator array 304 can be directed into any of the inputs in collimator array 306, or vice versa (light paths are reversible and inputs and outputs are equivalent).

As a result of first and second columns 312, 314, movement in the mirrors on MEMS substrate 310 is reduced compared to prior designs, which results in accurate positioning of light beams, improved performance and cheaper fabrication. A bi-directional vertical tilt 316 of the mirrors on MEMS substrate 310 provides most of the switching movement, while a unidirectional horizontal tilt 318 of the mirrors on MEMS substrate 310 corrects misalignment due to the non-planar light path for most cross-connect switching configurations. The horizontal tilt of the mirrors also allows the beams to be shifted to one side of mirror columns 312 and 314 when the cross-connect changes switching configurations. This prevents light from entering other channels during the switching process, thus reducing inter-channel noise.

Figure 4B:
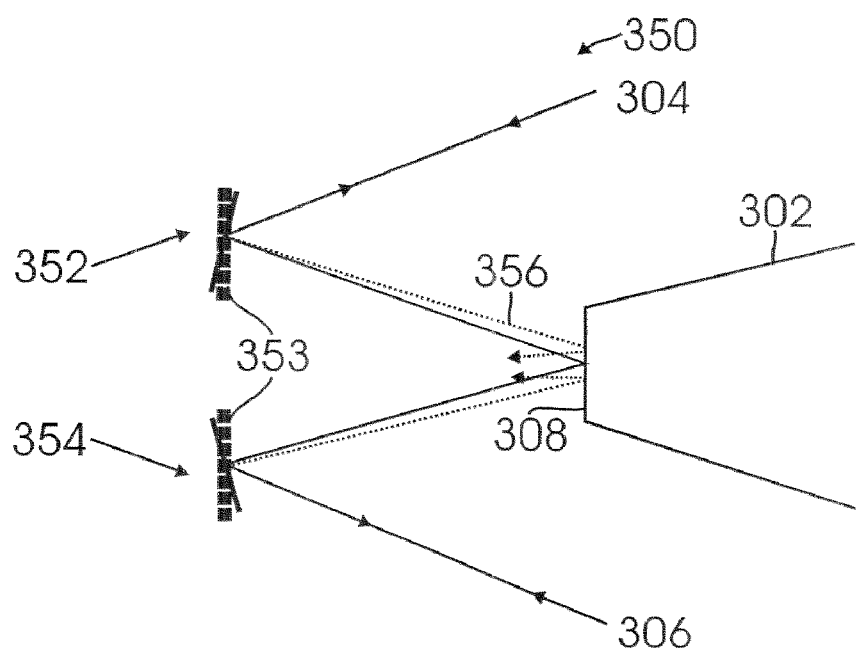
FIG. 4b shows a top view of the optical cross-connect of FIG. 3, in accordance with one aspect of the disclosure.

FIG. 4b shows a top view of optical cross-connect 300 of FIG. 3, in accordance with one aspect of the disclosure. Optical cross-connect 300 minimizes wiring complexity and electronic componentry typically associated with multiple MEMS-mirror substrate layouts. Light 350 is output from first collimator array 304, being deflected down partly as a result of the 8° angle polish and partly due to the angle on wedge 302. Light 350 hits mirror #1 (352) in MEMS substrate 310 causing it to deflect towards glass wedge 302. Reflective coating 308 on glass wedge 302 then causes light 350 to deflect toward MEMS mirror #9 (354) where it then deflects into second collimator array 306. With no voltages applied to the MEMS-mirror drive combs, light reflects from the top right mirror (mirror #1) into the top left mirror (mirror #9). However, as previously described, light can be routed to other mirrors (and hence channels) by bi-directionally tilting the mirrors at various angles. The greater the mirror tilt, the more the light moves down the column of mirrors and the more out-of-plane the light path becomes.

With this one axis of movement of the MEMS mirrors, optical coupling between any channel combination can be obtained, but the non-planar nature of the light path, for all but the mirror #1-to-mirror #9 coupling, creates a small error in horizontal beam alignment. As mentioned previously, this can be corrected if the MEMS mirrors also have horizontal tilt capability.

For each direction a MEMS mirror tilts, an electrical contact is required along with he accompanying wire bond and electrical lead to an electronics driver board. For four tilt directions (+ and − vertical tilt with + and − horizontal tilt) this can amount to very compressed and difficult MEMS substrate layouts requiring a large amount of space for the accompanying electrical lead layouts. In addition, driver electronics are needed for each tilt direction on each mirror.

The dotted light path 356, in FIG. 4b, shows the preferred alignment of the light for beams emanating from collimator arrays 304 and 306 when no voltage is applied to the drive combs for MEMS mirrors 352 and 354, leaving them in the positions represented by the dotted-mirror lines 353. As can be seen, in these positions, light will not pass from the appropriate output collimator array 304 to the appropriate output in collimator array 306 and a small voltage must be applied to the mirror 352 and 354 drive combs to tilt them as shown by the solid mirror lines in FIG. 4b and thus make the appropriate light from collimator array 304 enter collimator array 306.

The mismanagement offset in the zero-volts state is to ensure that, in all possible configurations for the optical cross-connect, mirrors 352 and 354 (and all the other mirrors in the same columns) will only need to be tilted in one direction to produce optimum coupling between any desired channels. Thus, the four tilt directions nominally needed for each MEMS mirror are reduced to three, yielding a 25% reduction in MEMS substrate layout and electronics complexity.

In summary, 1D collimators achieve effective 2D switching between optical cross-connect channels; MEMS substrate mirrors only need relatively large bi-directional motion on one axis, MEMS-substrate second-axis movement is much smaller and in one direction only, considerably reducing design and fabrication complexity; second-axis movement on MEMS substrate mirrors allows sideways beam deflection during switching to prevent unwanted channel noise and provide a 'bitless' optical cross-connect configuration.

While the disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. An optical cross-connect comprising:
    a glass wedge, having a front end and a back end, positioned between a first one-dimensional collimator array and a second one-dimensional collimator array, where the first collimator array includes a first groove array having a first set of etched grooves for placing a first group of optical fibers and the second collimator array includes a second groove array having a second set of etched grooves for placing a second group of optical fibers; and
    a Micro-Electro-Mechanical Systems (MEMS) substrate attached at a fixed distance from the front end of the glass wedge, the MEMS substrate including a first column of mirrors and a second column of mirrors, at least some of the mirrors in each column being capable of pivoting about a first axis and a second axis;
    wherein the at least some of the mirrors may pivot bi-directionally about the first axis and uni-directionally about the second axis.

2. The cross-connect of claim 1, wherein the first column is aligned with a first lens array on the first collimator array and the second column is aligned with a second lens array on the second collimator array.

3. The cross-connect of claim 1, wherein the first and second columns each include eight mirrors.

4. The cross-connect of claim 1, wherein the first and second columns each include sixteen mirrors.

5. The cross-connect of claim 1, wherein the etched grooves are V-shaped.

6. The cross-connect of claim 1, further comprising:
    a first glass plate on the first collimator array for securing the first group of optical fibers in the first set of grooves; and
    a second glass plate on the second collimator array for securing the second group of optical fibers in the second set of grooves.

7. The cross-connect of claim 1, wherein light beams from the first and second groups of optical fibers are aligned with the MEMS substrate.

8. The cross-connect of claim 6, wherein an angle polish is applied to ends of the first and second glass plates, the first and second V-groove arrays and the first and second groups of optical fibers.

9. The cross-connect of claim 1, wherein the at least some of the mirrors are offset about the second axis when the cross-connect is in a zero-volts state.

* * * * *